US012084031B2

(12) United States Patent
Bregeault et al.

(10) Patent No.: US 12,084,031 B2
(45) Date of Patent: Sep. 10, 2024

(54) HYDRAULICS ASSEMBLY, IN PARTICULAR FOR CONTROLLING THE BRAKE PRESSURE OF A WHEEL BRAKE OF AN ELECTRONICALLY SLIP-CONTROLLABLE BRAKE SYSTEM OF A MOTOR VEHICLE

(71) Applicant: Robert Bosch GmbH, Stuttgart (DE)

(72) Inventors: Julien Bregeault, Ludwigsburg (DE); Michael Kloss, Ilsfeld-Auenstein (DE); Hiroshi Kameyama, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 362 days.

(21) Appl. No.: 17/605,505

(22) PCT Filed: Feb. 10, 2020

(86) PCT No.: PCT/EP2020/053249
§ 371 (c)(1),
(2) Date: Oct. 21, 2021

(87) PCT Pub. No.: WO2020/216485
PCT Pub. Date: Oct. 29, 2020

(65) Prior Publication Data
US 2022/0203947 A1 Jun. 30, 2022

(30) Foreign Application Priority Data
Apr. 23, 2019 (DE) ................ 10 2019 205 803.5

(51) Int. Cl.
*B60T 8/36* (2006.01)
*B60T 8/34* (2006.01)
(Continued)

(52) U.S. Cl.
CPC ............. *B60T 8/343* (2013.01); *B60T 17/04* (2013.01); *B60T 17/06* (2013.01); *F15B 15/00* (2013.01); *B60T 2270/10* (2013.01)

(58) Field of Classification Search
CPC .......... B60T 8/343; B60T 17/04; B60T 17/06; B60T 2270/10
(Continued)

(56) References Cited

U.S. PATENT DOCUMENTS 5,577,813 A * 11/1996 Zaviska ................ B60T 8/4275
303/119.2
7,967,394 B2 * 6/2011 Lee ........................ B60T 13/686
303/DIG. 10
(Continued)

FOREIGN PATENT DOCUMENTS

DE 199 18 575 A1 12/1999
DE 102 36 389 A1 2/2004
(Continued)

OTHER PUBLICATIONS

International Search Report corresponding to PCT Application No. PCT/EP2020/053249, mailed Mar. 23, 2020 (German and English language document) (5 pages).

*Primary Examiner* — Christopher P Schwartz
(74) *Attorney, Agent, or Firm* — Maginot, Moore & Beck LLP (57) ABSTRACT

A hydraulics assembly, in particular for controlling the brake pressure of a wheel brake of an electronically slip-controllable brake system of a motor vehicle, includes a hydraulic block having a recess for receiving a pump element, a line connection for contacting the hydraulics assembly to the wheel brake, channels for providing the pump element with brake fluid, and a hydraulic cavity formed in the interior of the hydraulic block, which cavity is contacted with the recess for the pump element. The cavity includes a riser, which extends from the recess for the pump element in the direction toward the line connection of the hydraulic block and is contacted with the recess for the pump element. The suction line collects gas escaping from the pressure means
(Continued)

due to temperature and/or pressure changes and improves the operating noise of the hydraulics assembly.

10 Claims, 9 Drawing Sheets

(51) Int. Cl.
*B60T 17/04* (2006.01)
*B60T 17/06* (2006.01)
*F15B 15/00* (2006.01)

(58) Field of Classification Search
USPC ........ 303/10, 11, 113.1, 113.2, 116.1, 116.2, 303/116.3, 116.4, 119.1, 119.2, 119.3, 303/DIG. 10
See application file for complete search history.

(56) References Cited

U.S. PATENT DOCUMENTS

| | | | |
|---|---|---|---|
| 2004/0056529 A1* | 3/2004 | Otto | B60T 8/368 |
| | | | 303/119.3 |
| 2005/0056331 A1* | 3/2005 | Schlitzkus | F15B 21/041 |
| | | | 137/884 |
| 2006/0220768 A1* | 10/2006 | Iyatani | B60T 8/368 |
| | | | 335/78 |
| 2011/0035434 A1* | 2/2011 | Lockwood | H04L 51/04 |
| | | | 709/201 |

FOREIGN PATENT DOCUMENTS

| | | | |
|---|---|---|---|
| DE | 102016208365 A1 * | 11/2017 | ............ B60T 17/02 |
| DE | 10 2018 219 975 A1 | 5/2020 | |
| EP | 1 388 476 A2 | 2/2004 | |
| JP | 2003-63381 A | 3/2003 | |
| JP | 2005-515934 A | 6/2005 | |
| JP | 2008-30551 A | 2/2008 | |
| JP | 2017-47753 A | 3/2017 | |
| WO | 03/064229 A1 | 8/2003 | |

* cited by examiner

HYDRAULICS ASSEMBLY, IN PARTICULAR FOR CONTROLLING THE BRAKE PRESSURE OF A WHEEL BRAKE OF AN ELECTRONICALLY SLIP-CONTROLLABLE BRAKE SYSTEM OF A MOTOR VEHICLE

This application is a 35 U.S.C. § 371 National Stage Application of PCT/EP2020/053249, filed on Feb. 10, 2020, which claims the benefit of priority to Serial No. DE 10 2019 205 803.5, filed on Apr. 23, 2019 in Germany, the disclosures of which are incorporated herein by reference in their entirety.

BACKGROUND

An essential component of an electronically slip-controllable brake system is a hydraulics assembly which adapts the brake pressure of the wheel brakes to the slip conditions prevailing at that moment in time at the respective associated wheel. The brake fluids employed here can release a certain amount of gas, depending on the temperature and the pressure. If this brake pressure is then subjected to isobaric heating, for example self-heating, solar radiation, or engine heat and/or to an isothermal pressure drop such as, for example in the case of a regular reduction in brake pressure or possible cavitation, the release of gas from the brake fluid can occur again and cause gas bubbles to collect in the brake circuits. This behavior is influenced by different parameters such as, for example, the water content or the age of the brake fluid, the temperature, the pressure, the type of brake fluid, and the operating states of the brake system. Because of this property of the brake fluid, specific design or prediction of the behavior of a brake system over its lifetime can be performed only with difficulty. Also, up until now there have been no technical solutions for maintaining brake fluids permanently in a defined state.

Gas bubbles in the brake circuits influence the functional properties of a brake system, for example by being able to damp pressure pulses on the intake or delivery side of a pressure generator generating the brake pressure but also to amplify vibrations of the hydraulics assembly or cause undesired operating noise at the valves of the hydraulics assembly for controlling the brake pressure.

However, structural elements which reduce the above-mentioned disadvantageous effects are installed in current brake systems in order to fulfil market requirements with regard to functional properties, noise, and behavior of a brake system over its lifetime. These are, for example, flexible brake lines, elastic brackets for fastening a hydraulics assembly of an electronically slip-controllable brake system on a vehicle chassis, or are pulse-damping devices installed on the hydraulics assembly.

Devices of this type take up structural space, entail part and mounting costs, make it harder to predict the operating behavior of a brake system during its lifetime, and lastly make the design of a brake system more complex.

The present disclosure is based on a hydraulics assembly as is already known, for example, from the prior patent application DE 10 2018 219975. This hydraulics assembly comprises a hydraulic block with a recess for receiving a pump element, a line port for establishing contact between the hydraulics assembly and a wheel brake, ducts for supplying the pump element with brake fluid, and a hydraulic cavity, formed inside the hydraulic block and separated from the surroundings of the hydraulics assembly, which is at least in indirect contact with the receptacle for the pump element.

SUMMARY

The disclosure differs from the prior art in that the line port to a wheel brake is arranged in the region of an upper side of the hydraulic block, and in that a riser, which comprises part of the hydraulic cavity, runs from the recess of the pump element in the direction of the line port.

This feature enables the possibility of gas bubbles occurring in the brake system being able to collect almost automatically in this cavity owing to the active gravimetric buoyancy, and operating noise and pressure pulses generated by the pump element consequently being effectively reduced on the intake side of this pump element. The proposed measure can be implemented on the hydraulic block of the hydraulics assembly in a manner which is neutral in terms of structural space and entails no costs for additional components and their mounting. It can be realized in the production of the hydraulic block in a manner which is neutral in terms of structural space and can moreover be combined with known damping devices or may even make such additional damping devices dispensable. Lastly, the disclosed arrangement is characterized in that it is not prone to age-related wear and is effective unchanged over the lifetime of a hydraulics assembly. By virtue of the disclosed arrangement, the operating characteristics of the hydraulics assembly can be estimated consistently and overall more precisely over its lifetime, which in turn simplifies the design of a brake system.

Further advantages or advantageous developments of the disclosure result from the following description.

BRIEF DESCRIPTION OF THE DRAWINGS

Different exemplary embodiments of the disclosure are illustrated in the drawings and are explained in detail in the following description.

FIGS. 1, 5, 6, and 8 show in this connection the whole hydraulic block with two brake circuits, whilst only half of the hydraulic block and hence only one of the brake circuits can be seen in FIGS. 2 to 4 and 7.

DETAILED DESCRIPTION

Figure 1:
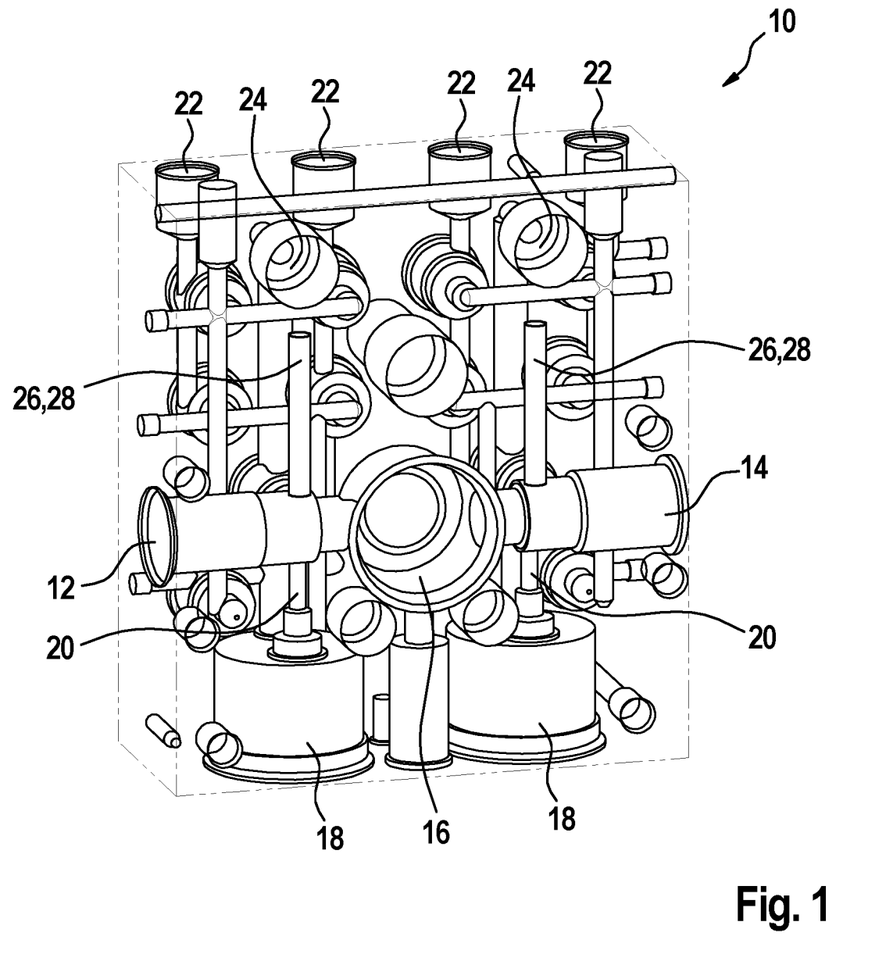
FIGS. 1 to 8 show, in each case in a three-dimensional view, a borehole diagram of a hydraulic block designed according to the disclosure of a hydraulics assembly of an electronically slip-controllable vehicle brake system.

The hydraulic block 10 according to FIG. 1 is frequently also referred to as a pump housing of a hydraulics assembly. It has a cuboid design and accordingly has in each case two opposite outer sides which are plane-parallel to each other per spatial axis. A plurality of recesses which are stepped in different fashions from outside to inside and have different dimensions are formed on these outer sides of the hydraulic block 10. Each of these recesses is open toward one of the outer sides and ends in the manner of a blind hole inside the hydraulic block 10. The recesses serve, for example, to receive pump elements equipped with pistons for the purpose of generating pressure, drive elements for actuating these pump pistons, valves for controlling the brake pressure generated by the pump elements, pressure medium stores for buffering brake fluid which is discharged from the wheel brakes in the course of reducing the brake pressure, or damping devices for damping pulses of the brake fluid. These hydraulic components are inserted into the recesses from outside for this purpose and are fastened or mounted therein. Hydraulic ports are furthermore present on the hydraulic block 10, via which contact can be established between this hydraulic block 10 and a master brake cylinder and/or the wheel brakes of a brake system by means of externally routed brake lines. The described recesses and ports are connected to one another via pressure medium ducts according to a hydraulic circuit diagram, known per se, of an electronically slip-controllable vehicle brake system. For reasons relating to structural space and/or manufacturing techniques, the recesses and pressure medium ducts are preferably arranged orthogonally relative to one another on the hydraulic block 10.

Two horizontally oriented recesses 12, 14 can be seen in FIG. 1 which, starting from the left-hand and from the right-hand outer side, extend inside the hydraulic block 10 and the inner ends of which open into a third recess 16 which is open toward the front side of the hydraulic block 10. The two horizontal recesses 12, 14 are provided in order each to receive a pump element. The third recess 16 is for this purpose intended to accommodate an eccentric element which can be driven in rotation and mechanically drives the pistons, projecting partially from opposite sides into the third recess 16, of the two pump elements in a back-and-forth stroke movement.

Two storage chambers 18 are furthermore present on the hydraulic block 10 shown, below the two recesses for the pump elements. These storage chambers 18 extend from the underside into the hydraulic block 10 and, in the event of a reduction in brake pressure taking place, receive pressure medium discharged from the wheel brakes. The storage chambers 18 are in each case joined hydraulically to in each case one of the recesses 12; 14 for the pump elements via a vertical duct 20. The vertical duct 20 thus connects the storage chamber 18 to an intake side of a pump element inserted into the associated recess 12; 14 and hence ensures that this pump element is supplied with brake fluid.

Line ports 22 and 24 are additionally formed on the hydraulic block 10. Four line ports 22 are arranged next to one another in a row on the upper side of the hydraulic block 10. These four line ports 22 are provided in order to connect the hydraulic block 10 to the wheel brakes of a vehicle brake system via external lines. Two further line ports 24 are situated in the region of the upper side on the front side of the hydraulic block 10. These two line ports 24 establish contact, via lines, between the hydraulic block 10 and the two brake circuits of a master brake cylinder.

It is to be assumed that the ready-mounted hydraulics assembly is arranged in its installed state on a vehicle chassis in such a way that, for reasons of making them accessible for establishing a mechanical contact between the hydraulics assembly and the external components described, the line ports 22, 24 are oriented upward and are therefore situated at or in the region of an upper side of the installed hydraulics assembly. FIG. 1 accordingly shows the hydraulic block 19 in its installed position.

As can be seen, the vertical duct 20 runs orthogonally to the recess 12, 14 of the pump element and, as mentioned, opens into this recess 12, 14 in the region of the intake side of a pump element. This region around the junction point corresponds within a brake circuit to the region of lowest pressure. As explained above, this can result in gas released hitherto escaping from the brake fluid in this region and collecting to form gas bubbles.

In order then to prevent gas bubbles that have already occurred being sucked in by the pump element and transported on to the pump delivery side, the vertical duct 20 is extended or continued on its side opposite the junction point with the pump receptacle. That section of the vertical duct 20 which extends over the recesses 12, 14 for the pump elements forms a riser 26 which extends, preferably in a vertical spatial direction, as far as the line ports 22, 24 formed on the hydraulic block 10. The riser 26 ends in the manner of a blind hole inside the hydraulic block 10 at a height situated below the line ports 24 for the master brake cylinder.

Any gas bubbles occurring at the intake side of a pump element enter the riser 26 owing to the active gravimetric buoyancy and rise inside this riser 26 to its closed end. The gas bubbles collect there. The region from which the driven pump element sucks in brake fluid is consequently largely free of gas bubbles and gas bubbles are thus prevented from penetrating as far as the delivery side of the pump element.

The riser 26 per se is part of a hydraulic cavity 28, formed inside the brake circuits, which contributes to avoiding pulses on the intake side of the pump element and lowering the operating noise of the hydraulics assembly. The volume of this hydraulic cavity 28 is matched for this to the maximum pressure medium volume which flows back to the intake side of the pump element via the as yet unclosed inlet valve during the compression phase of the pump element and/or to the maximum volume of gas which can potentially outgas from the pressure medium volume contained in the brake circuits by heating the brake fluid to its maximum operating temperature. The available volume of a riser 26 alone can be insufficient for this in some circumstances. For such cases, individual or multiple additional hydraulic cavities 28 can be provided on the hydraulic block 10 and be connected to the riser 26. Different variants of additional cavities 28 are illustrated in the drawings explained in detail below. All these additional cavities 28 extend from one of the outer sides of the hydraulic block into the inside of this hydraulic block 10 and are connected to one another via the mentioned riser 26. In addition, the additional cavities 28 are arranged in a region of the hydraulic block 10 which is situated between the recesses 12, 14 for the pump elements and the line ports 22, 24 of the hydraulic block 10.

Figure 2:
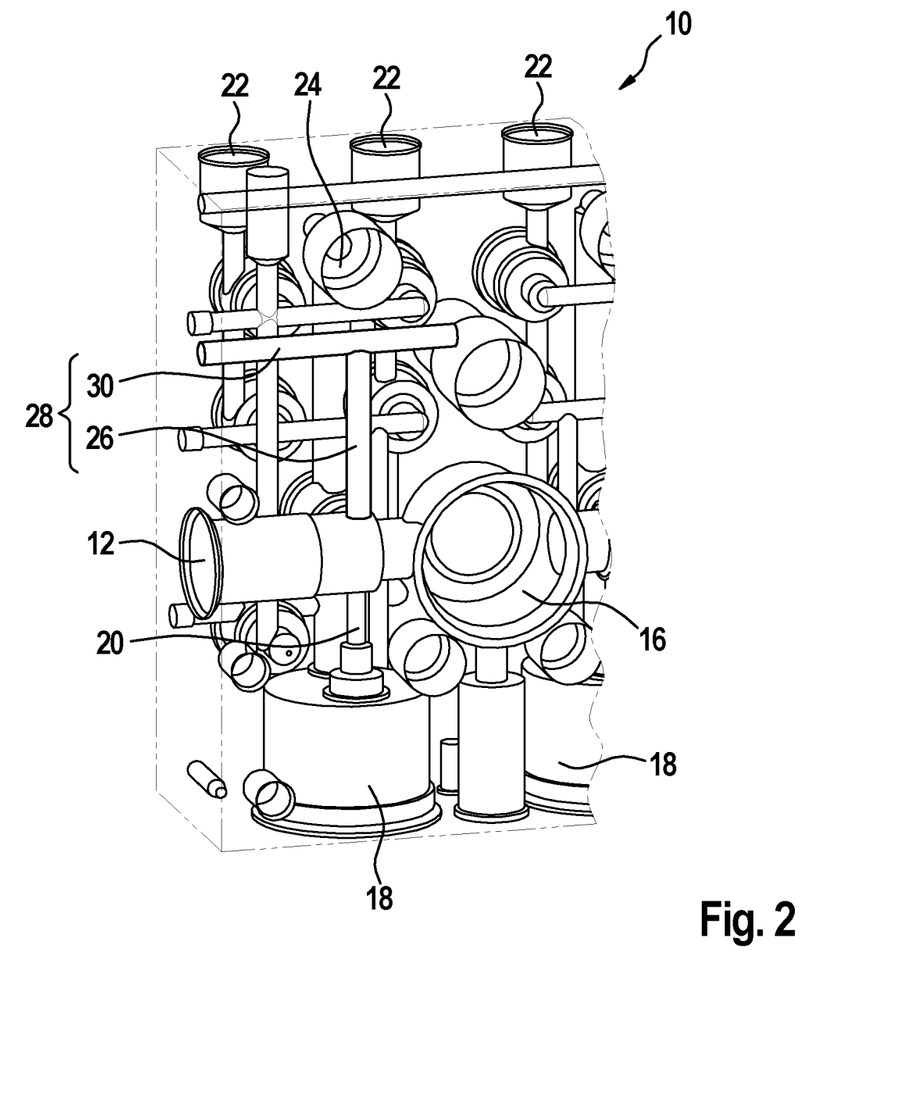

In the case of the alternative embodiment according to FIG. 2, the cavity 28 comprises, in addition to the riser 26, a horizontal bore 30 opening out on the left-hand outer side of the hydraulic block 10. This horizontal bore 30 is arranged at the height of the inner end of the riser 26 and crosses the riser 26 in a T-shape. The horizontal bore 30 and the riser 26 have, by way of example, the same internal diameter but this is not mandatory.

Figure 3:
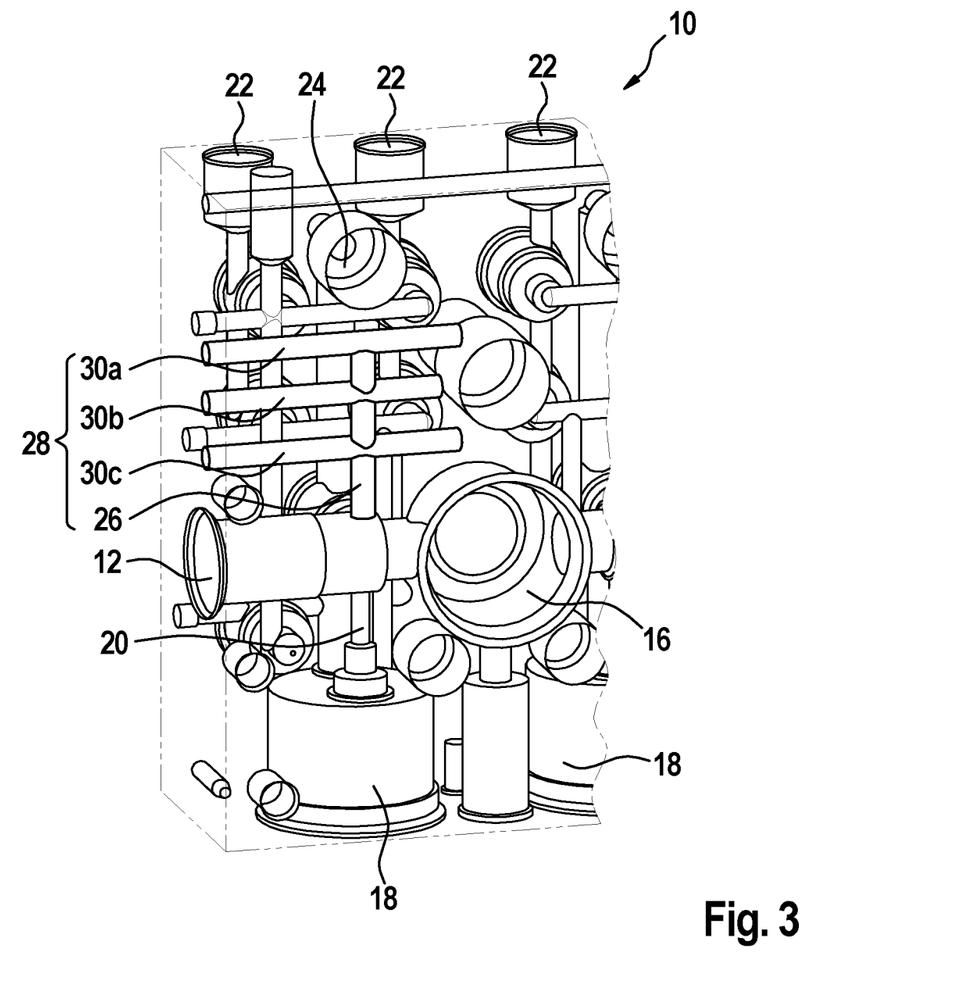
Figure 9:
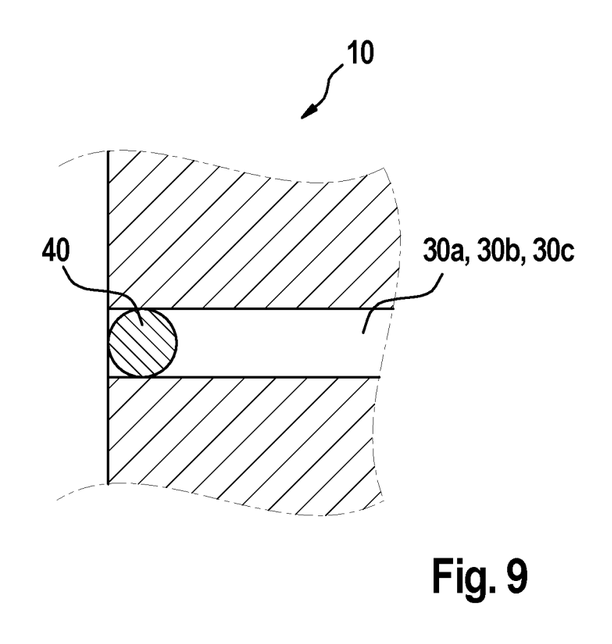
FIG. 9 is a cross-sectional view of a ball as a sealing element sealing a horizontal bore, shown schematically and not to scale. Mutually corresponding structural elements are provided with consistent reference numerals in the drawings.

In the alternative embodiment according to FIG. 3, the whole cavity 28 is composed of the riser 26 and multiple horizontal bores 30*a*, 30*b*, 30*c* running coaxially with respect to one another which cross this riser 26 at different heights and extend by way of example on both sides of this riser 26. As an example, all the horizontal bores 30*a*, 30*b*, 30*c* start from the left-hand outer side of the hydraulic block 10. The openings of the horizontal bores 30*a*, 30*b*, 30*c* to the outside are sealed by sealing elements when the hydraulics assembly has been fully mounted. Known sealing elements are, for example, balls 40 (shown schematically in FIG. 9) which are preferably pressed into the horizontal bores 30*a*, 30*b*, 30*c* in the region of the openings and seal the latter from the surroundings so that they are leakproof with respect to the pressure medium. As an alternative to balls, plugs, sealing screws, or disk-shaped covers can, for example, be used.

Figure 4:
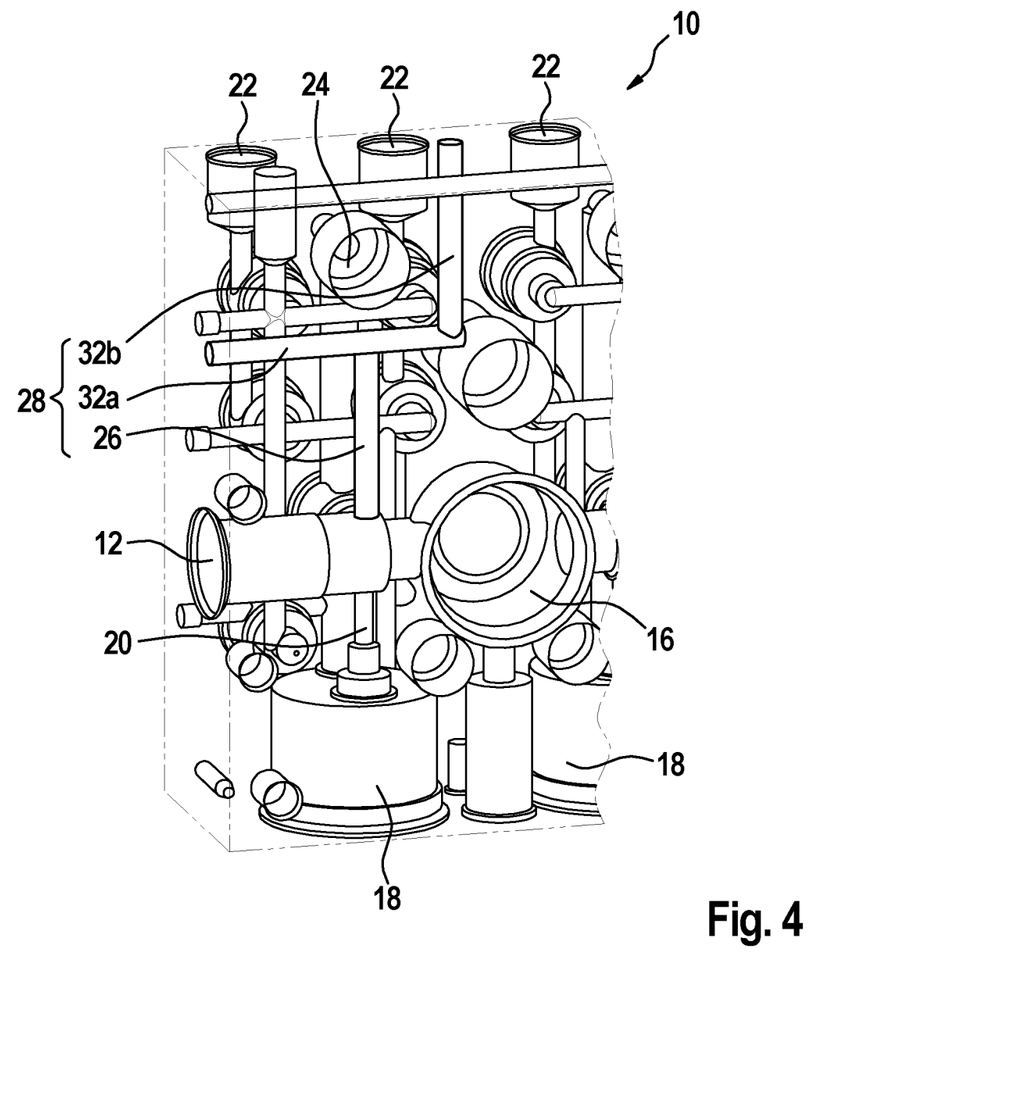

FIG. 4 shows a cavity 28 which consists of two blind bores 32a, 32b crossing each other at right angles. A first one of these blind bores 32a runs in turn horizontally at the height of the inner end of the riser 26 and starts from the left-hand outer side of the hydraulic block 10, whilst the second blind bore 32b, originating from the upper side of the hydraulic block 10, runs inward, vertically and offset axially parallel with respect to the riser 26 and opens into the first blind bore 32a at the end of the latter. Here too, the respective openings of the blind bores 32a, 32b are sealed so that they are leakproof with respect to the pressure medium when the hydraulics assembly is mounted, for example by pressed-in and/or caulked plugs, covers, or balls.

Figure 5:
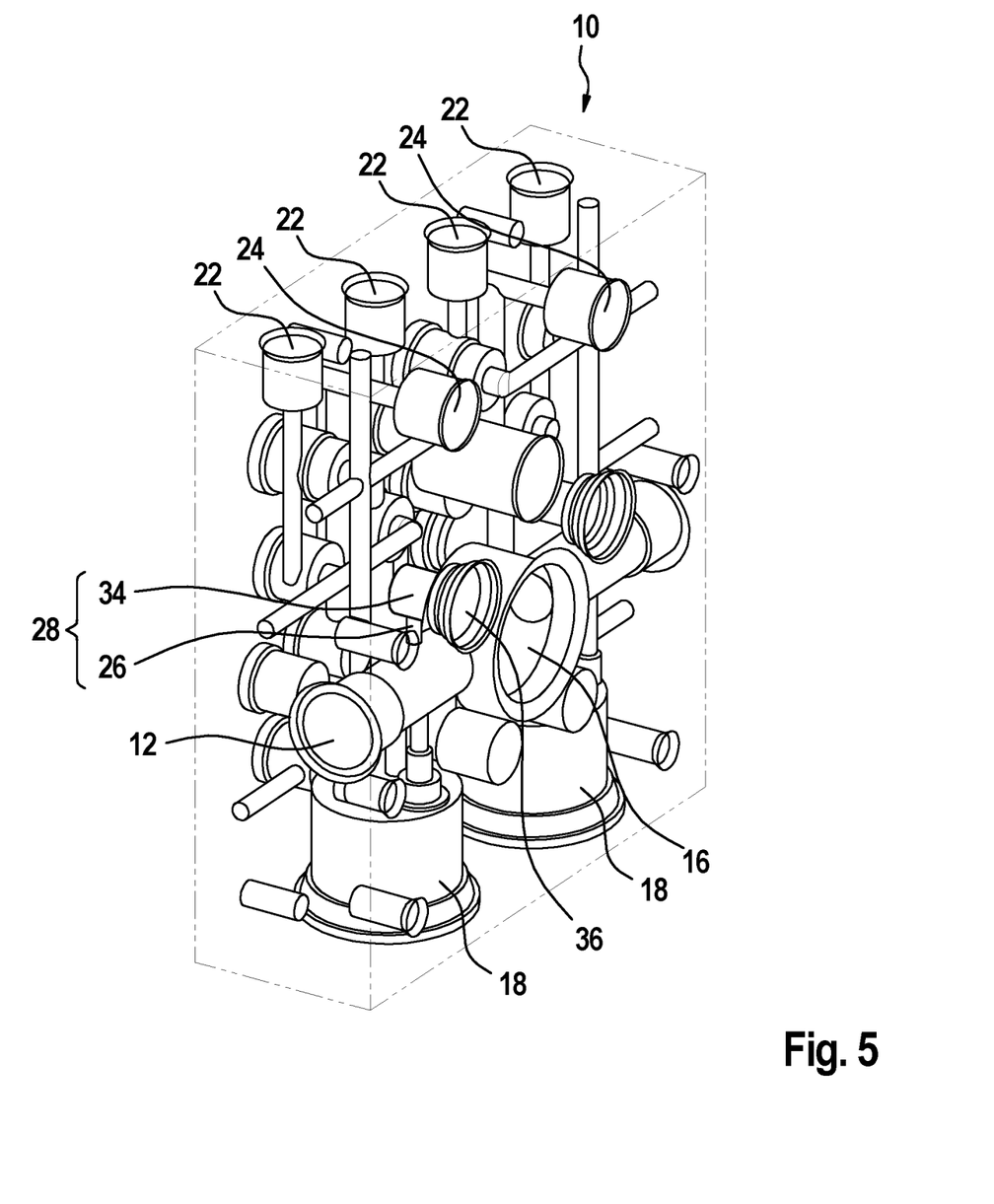

In FIG. 5, the riser 26 is in contact with a chamber 34, the internal diameter of which is significantly greater than the internal diameter of the riser 26 and which has a relatively small depth. The opening of the chamber 34 is sealed with respect to the surroundings by a sealing cover 36 which is fastened at its periphery to the hydraulic block 10 in a form-fitting and/or force-fitting manner by being caulked or in another fashion. A materially bonded connection such as, for example, adhesive bonding or an annular welded connection can also be envisaged for fastening the sealing cover 36 on the hydraulic block 10 so that it is leakproof with respect to the pressure medium.

Figure 6:
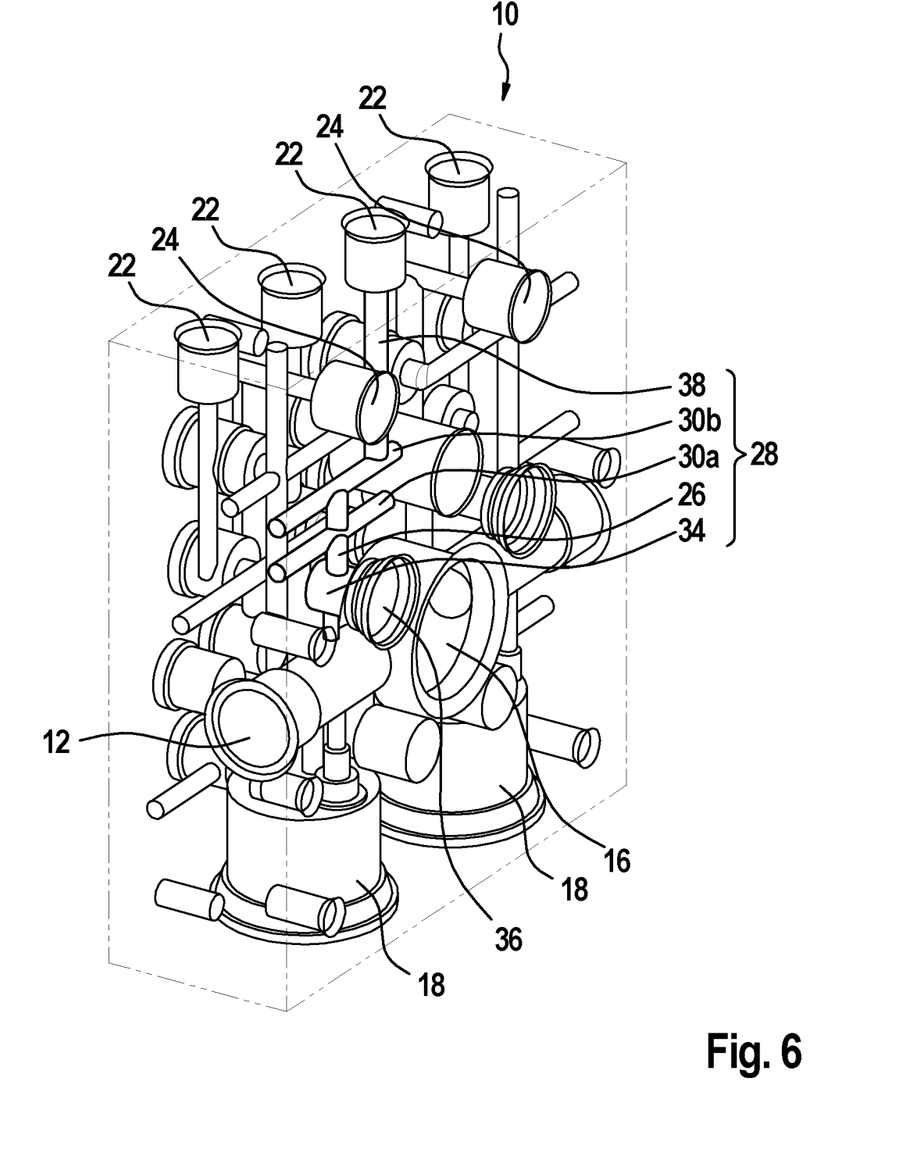

Any combination of the variants of the cavity mentioned is of course possible. Such a combination is shown by way of example in FIG. 6. In this exemplary embodiment, the whole cavity is made up by the riser 26 and multiple horizontal bores 30a, 30b, 30c starting from the left-hand outer side of the hydraulic block 10 and configured as blind holes, a least one vertical bore 38 leading to the upper side of the hydraulic block 10 and a chamber 34 opening out on the front side of the hydraulic block 10.

Figure 7:
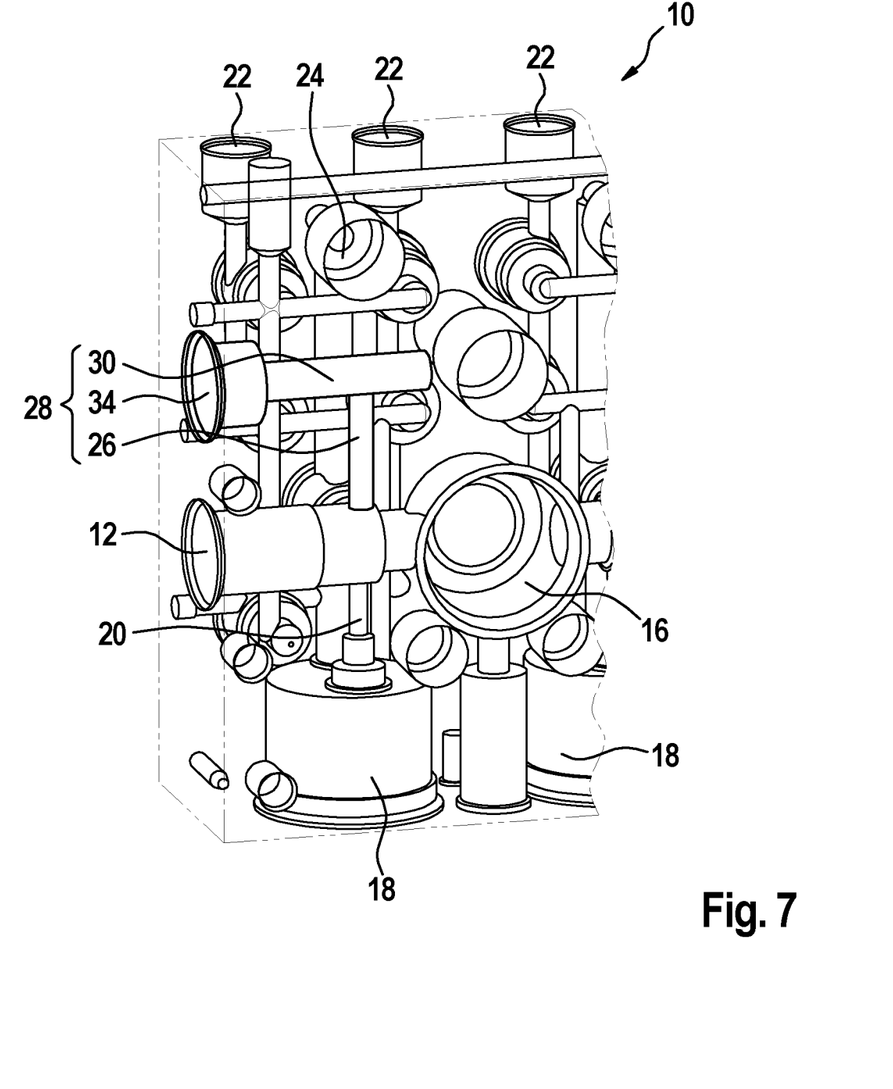

In the exemplary embodiment according to FIG. 7, the opening of the chamber 34 is situated, for example, on the left-hand outer side of the hydraulic block 10. A horizontal bore 30 connects the inside of the chamber 34 to the riser 26.

Figure 8:
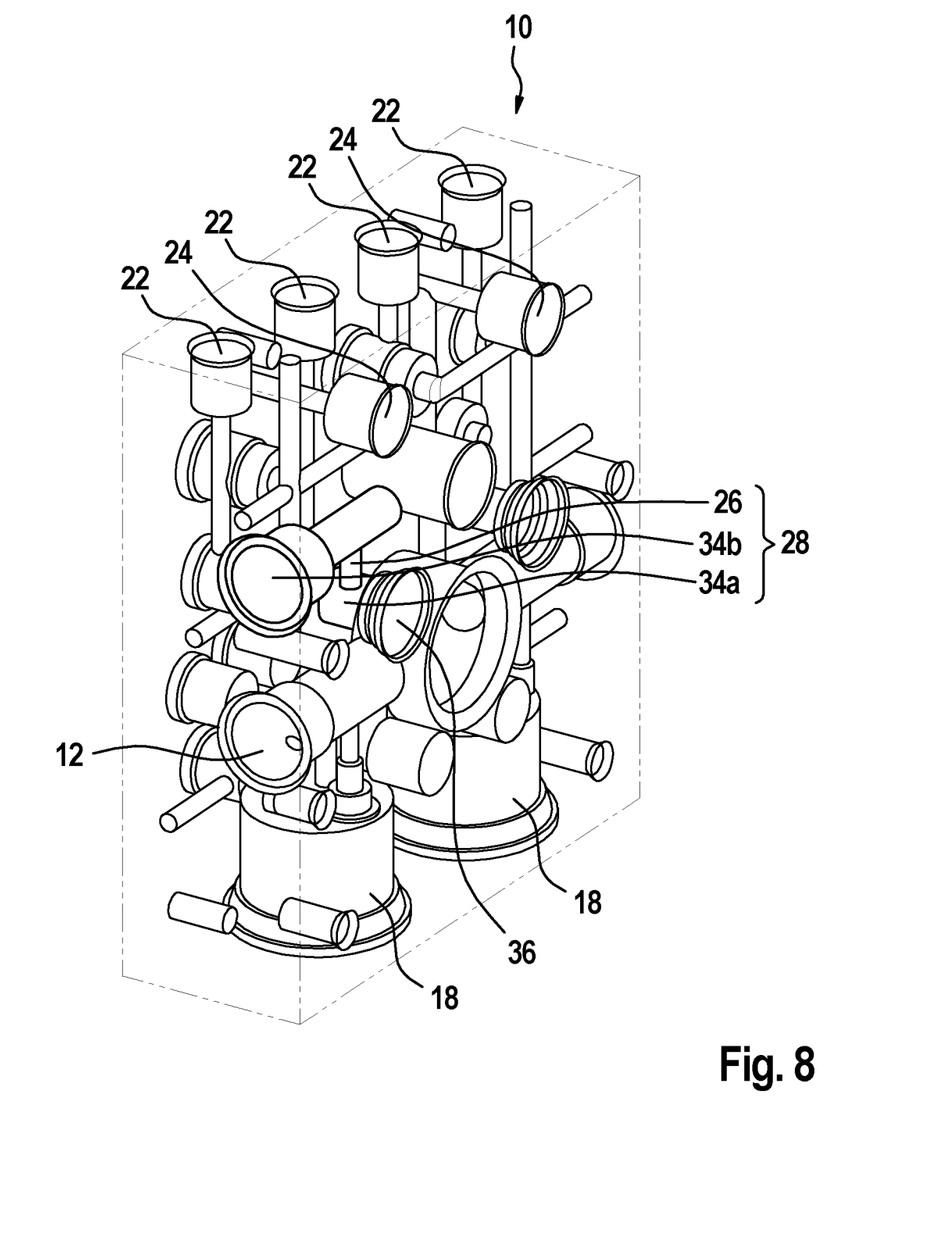

A further alternative embodiment illustrated in FIG. 8 comprises, by way of example, two chambers 34a, 34b, the openings of which open out on different outer sides of the hydraulic block 10. The chamber 34a is configured, as an example, so that it leads to the front side of the hydraulic block 10, whilst the opening of the second chamber 34b is situated, for example, on the left-hand outer side of the hydraulic block 10. The riser 26 crosses the first chamber 34a and opens into a horizontal bore 30, configured as a blind hole, which opens into the second chamber 34b. Alternative embodiments with more than two chambers 34 can be envisaged.

It is of course possible to adapt the cavities 28 which are disclosed in the different exemplary embodiments to the respective use case of a hydraulics assembly in terms of the number, orientation, and combination of their individual cavities. Common in all cases is that the cavities 28 in each case comprise a riser 26 which establishes a connection to the recess 12; 14 for the pump element, and that the cavities 28 each face the upper side, having the line ports 22; 24, of the hydraulic block 10, relative to the position of the pump element on the hydraulic block 10. As already explained, gas bubbles which are present can consequently rise via the riser 26 toward the upper side of the hydraulics assembly owing to the active gravitational force and collect at an end, remote from the pump elements, of the cavity 28.

It should lastly be pointed out that the exemplary embodiments in each case illustrate the formation of a hydraulic cavity 28, comprising a riser 26, at one of the brake circuits which are present. It is in principle envisageable to provide a hydraulic cavity 28 configured in this way only at one or at each brake circuit which is present. The cavities 28 of the individual brake circuits can thus be configured in the same or different way in terms of their total volume, the arrangement and/or design of the individual cavities connected to one another.

Other modifications or supplements to the exemplary embodiments described are of course conceivable without departing from the fundamental concept of the disclosure.

The invention claimed is:

1. A hydraulics assembly comprising:
   a hydraulic block comprising:
      a recess configured to receive a pump element;
      a line port on the hydraulic block configured to connect the hydraulics assembly to a wheel brake;
      a duct that opens into the recess and is configured to supply the pump element inserted into the recess with brake fluid; and
      a hydraulic cavity formed inside the hydraulic block and in contact with the recess,
      wherein the line port is arranged in a region of an upper side of the hydraulics assembly, and
      wherein the hydraulic cavity comprises a riser which runs from the recess in a direction toward the line port, the riser forming a blind bore that terminates inside the hydraulic block.

2. The hydraulics assembly as claimed in claim 1, wherein the hydraulic cavity has an opening facing an outer side of the hydraulic block, the opening configured to be sealed by a sealing element anchored on the hydraulic block.

3. The hydraulic assembly as claimed in claim 1, wherein the hydraulic cavity is arranged in a region of the hydraulic block situated between the recess and the line port.

4. The hydraulic assembly as claimed in claim 1, wherein a total volume of the hydraulic cavity corresponds to a volume of gas outgassed from the brake fluid when the brake fluid is heated to a maximum operating temperature.

5. The hydraulics assembly as claimed in claim 1, wherein the hydraulic assembly is arranged in a motor vehicle, and is configured to control brake pressure in the wheel brake of an electronically slip-controllable brake system of the motor vehicle.

6. The hydraulics assembly as claimed in claim 1, wherein:
   the recess includes a first portion has a first diameter and a second portion has a second diameter that is greater than the first portion, and
   the duct and the riser both open into the first portion of the recess.

7. The hydraulics assembly as claimed in claim 1, wherein the line port is defined in a first surface of the hydraulic block, and the blind bore terminates between the recess and the first surface.

8. A hydraulics assembly comprising
   a hydraulic block comprising:
      a recess configured to receive a pump element;
      a line port on the hydraulic block configured to connect the hydraulics assembly to a wheel brake;
      a duct that opens into the recess and is configured to supply the pump element inserted into the recess with brake fluid;

a hydraulic cavity formed inside the hydraulic block and in contact with the recess; and a storage device configured to hold the brake fluid, the storage device being in contact with the recess via the duct, wherein the line port is arranged in a region of an upper side of the hydraulics assembly, wherein the hydraulic cavity comprises a riser which runs from the recess in a direction toward the line port, and wherein the riser is configured as a straight extension of the duct.

9. The hydraulic assembly as claimed in claim 8, wherein the duct and the riser open out on opposite sides into the recess and run coaxially with respect to one another.

10. A hydraulics assembly comprising:

a hydraulic block comprising:

a recess configured to receive a pump element;

a line port on the hydraulic block configured to connect the hydraulics assembly to a wheel brake;

a duct that opens into the recess and is configured to supply the pump element inserted into the recess with brake fluid; and a hydraulic cavity formed inside the hydraulic block and in contact with the recess, wherein the line port is arranged in a region of an upper side of the hydraulics assembly, wherein the hydraulic cavity comprises a riser which runs from the recess in a direction toward the line port, and wherein a total volume of the hydraulic cavity corresponds to a pressure medium volume displaced by the pump element during a compression phase until an inlet valve of the pump element closes.

* * * * *